(No Model.)

A. FOWLER.
APPARATUS FOR PRESERVING MEATS.

No. 267,685. Patented Nov. 21, 1882.

Witnesses—
Robert W. Matthews
Thomas E. Crossman

Inventor—
Anderson Fowler
per James H. Whitney
Attorney.

UNITED STATES PATENT OFFICE.

ANDERSON FOWLER, OF NEW YORK, N. Y.

APPARATUS FOR PRESERVING MEATS.

SPECIFICATION forming part of Letters Patent No. 267,685, dated November 21, 1882.

Application filed December 9, 1881. (No model.)

*To all whom it may concern:*

Be it known that I, ANDERSON FOWLER, of the city, county, and State of New York, have invented certain Improvements in Apparatus for Applying Electricity to the Curing or Preservation of Meats, Fats, Fish, &c., of which the following is a specification.

This invention is designed to provide an apparatus for carrying into rapid, cheap, and effective operation the process of preserving and curing meats, fats, fish, &c., by subjecting the same simultaneously to the action of a current of electricity, and of a preservative substance, as set forth in my application for Letters Patent filed October 30, 1880, Serial No. 19,806; but my said invention herein may be employed with advantage wherever it is desirable to subject substances of the character indicated to the pervasive or permeating action of electricity.

Figure 1:
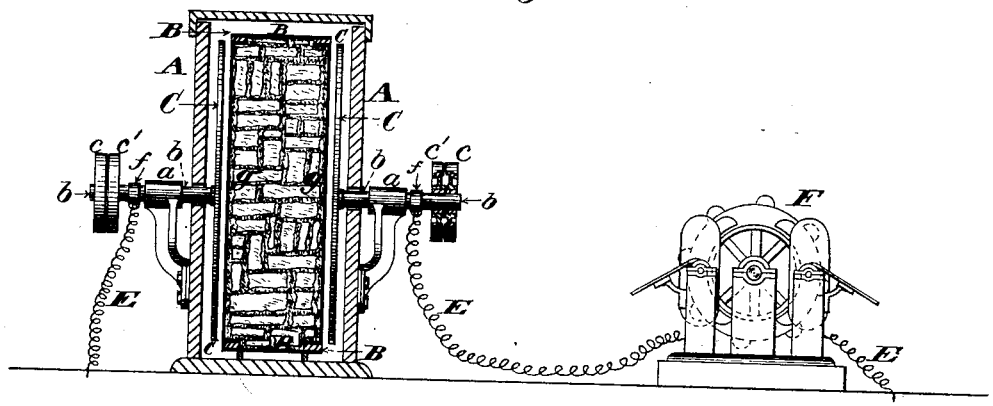
Figure 2:
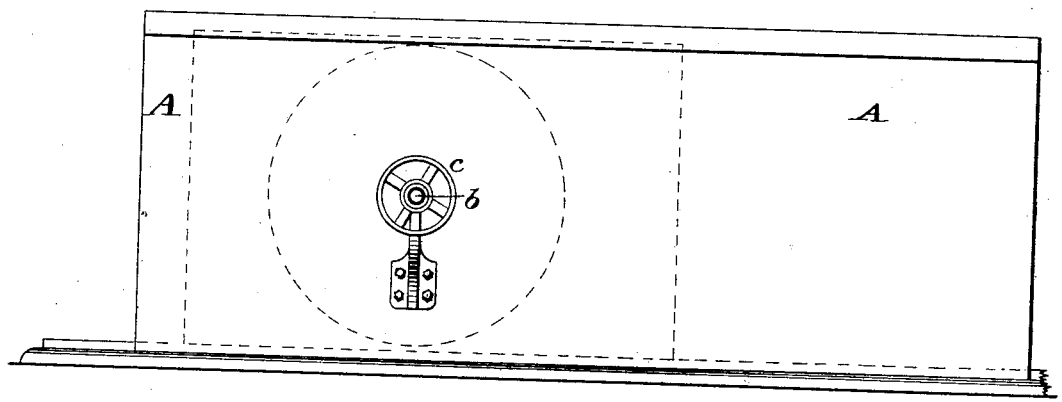

Figure 1 is a vertical transverse sectional view of an apparatus embraced in my said invention, and Fig. 2 is a vertical longitudinal sectional view of the same.

A is an oblong box or tube, which may be of rectangular cross-section, as shown in Fig. 1. This box A is preferably horizontal in position, and with open ends, so that a case or box, B, of smaller size, may be pushed through the same from end to end, and so that any desired number of such cases or boxes B may be pushed in succession through the said oblong box or tube, A.

Provided at or in the two opposite sides of the box A are bearings $a$, which are insulated from the sides of the box A by any suitable means, and each of which receives the journal of a horizontal shaft, $b$, the said shaft $b$ being preferably in the same axial line, and each provided with a fast and loose pulley, $c$ $c'$, through which, by means of suitable belts, it may be rotated or stopped, as occasion may require.

Upon the inner end of each shaft $b$ is placed a metallic disk, C, preferably of circular circumferential contour, and attached to its shaft $b$ at its center. The disks C are placed within the box A adjacent to but not touching the inner surfaces of the sides thereof, and with a space between them sufficient to permit the passage lengthwise of said box A of the cases or smaller boxes B, as hereinbefore indicated.

Between the hubs of the pulleys $c$ $c'$ and the shafts $b$, to which they are attached, is interposed any suitable non-conducting packing or substance which will prevent the transmission of the electrical current from the said shaft $b$ to the said pulleys, or any of them. Placed upon each of the said shafts $b$, and working preferably in a circumferential groove in each, is a collar or ring, $f$, to which are attached the circuit-wires E, which connect in the usual manner, through a ground-connection or otherwise, with a dynamo-electric machine—such, for example, as the well-known Gramme machine, (or any suitable battery or appropriate source of electricity,) and indicated at F, in such manner that the current of electricity generated will pass from one of the plates C to the other, and through the space between them.

Each case or smaller box B has its sides $g$, which pass adjacent to the disks C, of metal, this being of course a good conductor of electricity, whereas the bottom, top, and ends of said case or smaller box B should be either of some material that, relatively speaking, is a non-conductor of electricity, or they should be insulated from the sides $g$ of the box by the interposition of strips of glass or other suitable non-conductor of electricity, the object of this being to prevent the electric current from passing around through the top, bottom, or ends, as the case may be, instead of from one of the sides $g$ to the other side of the case B, the object being to insure the passage of the electric current through the interior of the said case from one side to the other, and consequently through the substance or substances placed or packed therein, in order that the electrical current may act upon said substance or substances.

The meats, fats, fish, or similar organic substance to be preserved, should be packed in the cases or smaller boxes B and surrounded by a suitable preservative agent—such as salt, saltpeter, or salicylic acid—substantially as set forth and described in my application filed October 30, 1880, aforesaid, and which, being set forth in said application, need not be specifically described herein. During the operation of the apparatus the dynamo-electric machine F is of course in operation to generate the desired electric current, and simultaneous therewith the disks C are caused to rotate in opposite directions by the revolution of the fast pulleys on their respective shafts $b$. The cases or smaller boxes B, being closed, and having the substance to be acted upon to be cured or preserved packed therein, as just set forth, are passed longitudinally through the box or tube A and between the disks C. As each case or box B passes into the space between the disks C the electric current is caused to pass through the conducting-sides of the case or box B, and through the contents thereof, this action being of course exerted upon the entire contents of the case or box. Inasmuch as the said case or box is caused to pass between the disks C, and inasmuch as the cases or boxes B may be very rapidly passed one after another through the box or tube A and between the disks C, it follows that the operation of subjecting the contents of each case or box B to the action of the electricity is very rapidly accomplished, and from the rotation in opposite directions of the disks C, and from the intensity of the current derived from the dynamo-electric machine, a powerful effect of the character indicated in my aforesaid application filed October 30, 1880, is effected upon the meats, fats, fish, or like organic substance thus acted upon by the electrical current, and the process of thus treating organic substances with electricity is rendered very cheap, as well as very intense in its action and thorough in its results.

What I claim as my invention is—

1. In an apparatus for subjecting organic substances to the action of electricity, the combination of the oblong box or tube A, the disks C, connected with suitable means for generating and maintaining a current of electricity, and one or more cases or boxes, B, adapted to pass lengthwise of the box A and between the disks C, and to contain the substance to be treated, all substantially as and for the purpose herein set forth.

2. In an apparatus for subjecting organic substances to the action of electricity, the combination of the disks C, arranged to rotate in opposite directions, the box or tube A, one or more cases or boxes, B, constructed to pass through the box A and between the disks C, and wires or conductors adapted to connect the same with a source of electricity, arranged to pass a current of electricity from one to the other of the disks C, and through the contents of a case or box, B, as the latter is passed through the box or tube A, all substantially as and for the purpose herein set forth.

3. In an apparatus for subjecting organic substances to the action of electricity, the combination of the insulated bearings $a$ and insulated pulleys $c\ c'$ with the shafts $b$, the disks C, the box or tube A, and one or more cases or boxes, B, adapted to be passed through the box A and between the disks C, all substantially as and for the purpose herein set forth.

4. In an apparatus for subjecting organic substances to the action of electricity, the combination of one or more cases or boxes, B, having sides capable of conducting electricity, and non-conducting ends, top, and bottom, the box or tube A, the disks C, and wires or conductors adapted to connect the apparatus with a source of electricity in order to maintain a current of electricity from one of the disks C to the other, the conducting sides of the cases or boxes B, and the contents of said cases or boxes, all substantially as and for the purpose herein set forth.

ANDERSON FOWLER.

Witnesses:
C. S. WALKER,
RICHD. B. KELLY.